UNITED STATES PATENT OFFICE.

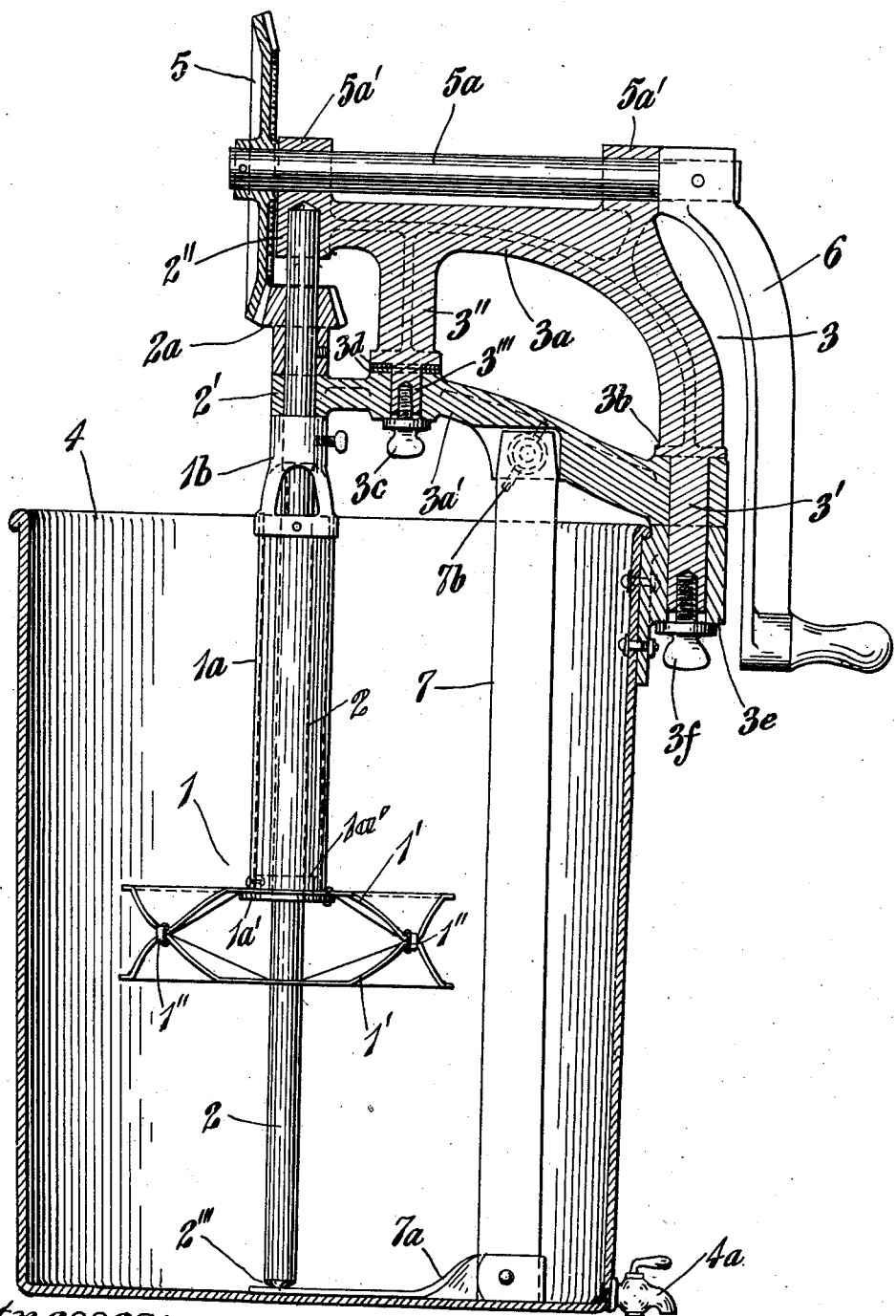

ALPHEUS FAY, OF LOUISVILLE, KENTUCKY.

CREAM-SEPARATOR AND CHURN.

991,435.  Specification of Letters Patent.  Patented May 2, 1911.

Application filed February 23, 1911. Serial No. 610,351.

*To all whom it may concern:*

Be it known that I, ALPHEUS FAY, a citizen of the United States, and resident of Louisville, in the county of Jefferson and State of Kentucky, have invented a certain new and useful Cream-Separator and Churn, of which the following is a specification.

The object of my invention is to provide improved means for successively separating the cream from milk, and then churning the cream to extract the butter, by a combined mechanical and aerating treatment.

My invention has as a further object the performance of other operations in connection with the treatment of milk or butter, where a mechanical agitation or aeration, or both, may be necessary or desirable.

My invention consists in the provision of improved details in connection with the driving mechanism and in the combination therewith of a novel form of agitator, for imparting centrifugal movement to the liquid, and in other details in combination therewith, as will be hereinafter more fully set forth and claimed.

The drawing illustrates an embodiment of my invention, being a vertical sectional elevation of the same.

The agitator 1 is of such design as to centrifugally impel the liquid, as will be described, and is mounted on a vertical shaft 2, having bearings $2'$ and $2''$ in a bracket 3 on the vessel 4.

Between the bearings $2'$ and $2''$ the shaft 2 has a bevel pinion $2^a$ rigidly mounted on it, which bears downward against the bearing $2'$. A suitable step-bearing $2'''$ is provided for the shaft 2 in the bottom of the vessel 4. The bevel gear $2^a$ meshes with a bevel gear 5, rigid on a horizontal shaft $5^a$ having bearings $5^{a'}$ in the bracket 3, and extending out over one side of the vessel to receive a handle 6 for manually operating the device.

The bracket 3 comprises the two upwardly curved transverse members $3^a$ and $3^{a'}$, converging to a hub $3^b$ and lying in vertical alinement, the upper one carrying the bearing $2''$ and the lower one supporting the bearing $2'$, for the agitator shaft 2. These two members are connected at the hub $3^b$ by a downwardly extending stud $3'$ in the hub $3^b$ passing through an opening in the lower member, the hub $3^b$ being integral with the upper member; they are also connected by a supplemental support $3''$, also integral with the upper member and extending down therefrom near the bearings $2'$ and $2''$ and having a stud $3'''$ that extends down through the lower member at this point. A clamping screw $3^c$ takes into the stud $3'''$ and is tightened against the lower side of the lower member. By this means, the lower member not only carries the bearing $2'$ at the proper distance from the bearing $2''$, but it also acts as a supplemental bracket for the upper member, which is in effect the main bracket, carrying the bearings $5^a$ for the shaft $5^a$, as before mentioned.

The bearing $2''$ in the upper member or main bracket, coming under the adjacent bearing of the shaft $5^a$, is closed at its top and bears down on the end of the shaft, pressing the pinion against the bearing $2'$ below, as before stated, thus preventing vertical or end play of the shaft 2. To compensate for wear of these parts, I prefer to provide one or more washers $3^d$ between the supplemental support $3''$ and the lower or supplemental member, which may be removed to allow the members to be drawn closer together by the screw $3^c$.

The stud $3'$, passing through the lower member, extends further downward, and enters a bracket $3^e$ on the side of the vessel 4, near its rim, and receives a clamping screw $3^f$ that is tightened upward against the lower side of the bracket $3^e$. By this means the entire bracket 3 and the parts which it supports are removably mounted on the vessel, and are held rigid when in position thereon.

The agitator 1 comprises a series of superposed rigidly assembled impelling members $1'$, in this case being only two in number, secured to the lower open end of a tubular shaft $1^a$, which, in turn, is held in a hub $1^b$ at its upper end, the hub $1^b$ being of open construction to admit atmospheric air to the tubular shaft. This open upper end of the tubular shaft is approximately even with the upper rim of the vessel 4, and it is for the accommodation of the hub $1^b$ above the rim of the vessel that the bracket 3 has its members upwardly curved as before described. The hub 1ᵇ is secured to the shaft 2 by a set screw, so that it may be loosened and adjusted up or down on said shaft, carrying the other parts of the agitator with it, to provide for operating on different quantities of liquid in the vessel, it being generally desirable to have the agitator impeller members at about the middle of the body of liquid in the vessel, vertically.

Each of the members 1′ of the impeller consists of a series of radial channels of outwardly increasing triangular cross section joined by plane web parts, and are advantageously made of sheet metal; their general contour is circular. As shown herein, the two members of such formation are reversed with relation to each other, so that the outward terminations of their channels meet, and they are rigidly joined together thereat, preferably by means of clips 1″ embracing the adjacent parts of each, across their peripheries, and riveted through them. This adds strength to the assembled impeller. The lower member 1′ has an opening in its center to fit snugly around the shaft 2, but the upper one has an opening approximating the diameter of the tubular shaft to admit air inside the impeller or agitator 1 under the induction of the vacuum produced centrally therein due to the outflow of liquid therefrom under the centrifugal action set up by the action of the impellers as they are rotated with their radiating channels impinging upon the adjacent liquid. The peculiar formation imparted to the interior of the agitator by the combination of the channellated members adapts it for setting up this centrifugal action, but at the same time affords ample capacity for aeration by the ready passage of air from the tubular shaft.

Preferably, the impeller is attached to the tubular shaft by a collar 1ᵃ′ with a vertical flange extending up through the central opening in the upper impeller member, which is made large enough for this purpose, the flange being fitted snugly around the tubular shaft near its lower end and riveted or otherwise suitably rigidly secured thereto; the collar has another flange extending out under the lower side of the upper member and similarly secured thereto.

The brake to coact with the agitator or impeller 1 consists in a vertical strip 7 at one side of the vessel, with its upper end clamped to the lower or supplemental bracket 3ᵃ and having its lower end bearing firmly against the bottom of the vessel. It may be of sufficient relative length to be flexed slightly against the direction of action of the agitator 1 when it is thus secured in position. The agitator and its shaft and other operative mechanism is displaced somewhat from the center of the vessel to admit the brake 7 in its position therein.

The vessel 4 may have an outlet 4ᵃ, suitably controlled, as shown.

My invention is most advantageously used in cream separation and churning, and it is also suitable for operating upon butter of poor quality, to improve the butter and render it palatable and marketable.

In the separating and churning process, fresh sweet milk is placed in the vessel 4, almost filling it, the agitator 1 being adjusted to its uppermost position, as illustrated in the drawing, so that the upper end of the tubular shaft 1ᵃ is above the surface of the liquid. The milk is then agitated by the operation of the mechanism, the agitator exerting a centrifugal impelling effect on the milk, as above stated, and setting up currents in the liquid to produce complete circulation throughout the body of liquid, and producing a partial vacuum in the central region of the impeller by the displacement of liquid therefrom, which induces a downward circulation of air through the tubular shaft 1ᵃ, which air is readily distributed along with the liquid, throughout the body of the liquid, under the centrifugal action, and thoroughly aerating the milk. The milk is preferably introduced into the vessel at a temperature of from 40 to 50 degrees Fahrenheit, while the air entering the liquid is of atmospheric temperature, or about 60 or 70 degrees Fahrenheit, and of substantially atmospheric pressure.

After the milk has been agitated and aerated in the above manner for a period of from five to ten minutes, the cream will be in proper condition to separate from the milk in its entirety, upon which the agitation ceases and the liquid is allowed to rest for a few minutes, until the separation of the cream from the milk has become complete, and the cream has risen to the top of the vessel. Then the skimmed milk is drawn off through the outlet 4ᵃ, leaving the separated cream in the vessel. By varying the volume of skimmed milk drawn off, the cream may be left with any ordinary percentage of butter fat desired. The desired proportion of skimmed milk having been withdrawn, the agitation is resumed to perform the churning operation, the agitator 1 being lowered to the proper position on the shaft 2 to operate on the reduced quantity of liquid now left in the vessel. The temperature of the cream in the vessel will now have risen to approximately the atmospheric temperature, or from 60 to 65 degrees Fahrenheit, and the churning agitation is continued at this temperature until the butter is separated from the cream, which will ordinarily require about from three to five minutes of time. The butter may then be removed and worked in the usual manner, and for conveniently removing the butter, the bracket 3 may be readily detached from the vessel 4 along with the agitator and its shaft and the brake 7, leaving free access to the interior of the vessel and leaving it smooth with an entire absence of projections or crevices, facilitating a thorough removal of the butter and permitting a thorough cleansing of the interior of the vessel after the residue from the churning has been withdrawn through the outlet 4ª. If desired, the skimmed milk that was previously withdrawn may now be added to the residue from churning, before withdrawal thereof, and the agitator 1 be again introduced into the liquids and operated to thoroughly mix them, resulting in the production of a good serviceable fresh sweet milk, which contains all the natural solids of the milk except the butter fats, and which has the natural flavors of the fresh whole milk.

A poor quality of butter may be operated upon to improve it by the use of my invention, placing such butter in a suitable amount of pure water in the vessel 4, and agitating it and aerating it in the manner above described, at a temperature of from 50 to 60 degrees Fahrenheit. Thus the butter may be granulated, permitting a most efficient purifying action of the air thereon and of the water in the vessel, which may be withdrawn and fresh water introduced, as may be required, the entire operation resulting in producing the butter granules in a neutral state, with their impurities eliminated. The neutral granules may then be removed and salted and worked and otherwise treated according to good practice in the production of marketable and palatable fresh butter, with which it is identical. Moreover, if desired, these granules may be mixed with sweet milk to produce a high quality of cream of any desired percentage of butter fat, of smooth consistency, thoroughly fresh, sweet and pure, and adaptable for all the uses that good cream is usually employed in. This mixing is readily accomplished by the use of my invention. The combined aeration and agitation is especially desirable feature of all of the processes above described.

Other advantageous uses will be suggested in the employment of the invention, and divers modifications may occur in its use. For instance, the vessel employed may be of wood, rather than of metal as here represented, in which case the lower step bearing for the shaft 2 could be directly in the bottom of the vessel. However, in the example illustrated, the vessel is preferably provided with an enamel finish inside, making it undesirable to have this step-bearing directly on the bottom of the vessel, and a foot 7ª is mounted on the lower end of the brake 7, extending over to the shaft 2 and carrying the step-bearing 2''' therefor, hereinbefore referred to. This step-bearing is merely countersunk into the flat surface of the foot 7ª, which consists of a flat strip of metal twisted through a right angle from the shaft to the brake, so that it may hook around the brake and have a rivet passed through its two members thus flanking the brake and through the brake itself, securing them rigidly together; this also constitutes a ferrule for the lower end of the brake, which is preferably of wood. The brake 7 is adjustably held to the lower supplemental frame member 3ª' by a set screw 7ᵇ, so that it may be adjusted to press the foot 7ª firmly against the bottom of the vessel when the bracket 3 is secured in position, and so that it may be loosened and swung aside to permit the agitator 1 to be removed from the shaft 2 when the parts are removed from the vessel, as may be desirable in thoroughly cleaning the parts.

Having fully described my invention, what I claim as new and desire to secure by Letters Patent is:

1. In a cream separator and churn, the combination of a separating vessel, a bracket secured to the side of the vessel and provided with a socket, a bracket carrying bearings for a horizontal shaft and provided with a stud adapted to fit within the socket, a supplemental support formed integrally with the bracket and provided with a securing stud at its bottom, a supplemental bracket engaging the stem on the bracket aforementioned and provided with a bearing for a vertical shaft, said bracket aforementioned also having a bearing in vertical alinement with the bearing in the supplemental bracket, a socket in the supplemental bracket adapted to receive the stud of the supplemental support, a set screw in said stud of the supplemental support for securing it in its socket, a set screw for securing the bracket stud in the socket of the bracket on the vessel, a vertical shaft in the alined bearings aforementioned, and agitating means on said shaft, a bevel gear on said vertical shaft and a bevel gear on the horizontal shaft meshing with the bevel gear on the vertical shaft, substantially as specified.

2. In a cream separator and churn, a bracket of upwardly curved formation having, integrally formed, horizontal shaft bearings, a vertical shaft bearing, and a downwardly extending supplemental support, a supplemental bracket attached to the supplemental support and also curved upwardly, and having an alined bearing for a vertical shaft, said brackets curving together and being joined for attachment to a vessel.

3. In a cream separator and churn, a vertical shaft and an agitator thereon, an upper bracket with bearings for the shaft, a brake adjustable on the bracket and extending down parallel to the shaft to coöperate with the agitator, and a foot on the lower part of the brake extending radially over to the shaft and having a step bearing therefor, the brake being adapted to swing away from the shaft, as adjustable on the bracket, so that the step bearing is removed from the shaft to allow the agitator to be removed from the shaft.

ALPHEUS FAY.

Witnesses:
STANLEY L. BLANKENSHIP,
MILES S. FAY.

Copies of this patent may be obtained for five cents each, by addressing the "Commissioner of Patents, Washington, D. C."